UNITED STATES PATENT OFFICE.

EUGEN BERGMANN, OF OHLAU, GERMANY.

METHOD OF PRODUCING DICALCIUM PHOSPHATE.

No. 852,371.     Specification of Letters Patent.     Patented April 30, 1907.

Application filed October 13, 1903. Serial No. 176,873.

*To all whom it may concern:*

Be it known that I, EUGEN BERGMANN, manufacturer, a citizen of the German Empire, residing at Ohlau, Silesia, Germany, have invented a new or Improved Method of Producing Dicalcium Phosphate, of which the following is a specification.

This invention relates to a method of producing dicalcium phosphate by using the known reactions whereby tricalcium phosphate is dissolved in cold aqueous sulfurous acid and the sulfurous acid is then eliminated from such solution by boiling.

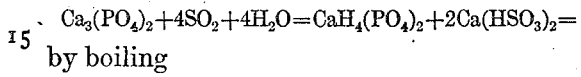

by boiling

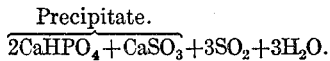

(Compare *Wagner's Jahresbericht* 1882, page 389. Investigations by Rotondi). The dicalcium phosphate obtained by such reaction has the disadvantage that the precipitate contains calcium sulfite, which appears to render its suitability as an ingredient for cattle food doubtful, as no investigations have been made on the action of sulfites on the stomachs of animals.

In order to obtain a dicalcium phosphate free from the sulfite of calcium, this invention provides that monocalcium phosphate should be added to the solution of tricalcium phosphate in aqueous sulfurous acid or to the precipitate obtained by boiling such solution, and then the sulfurous acid should be expelled by boiling:

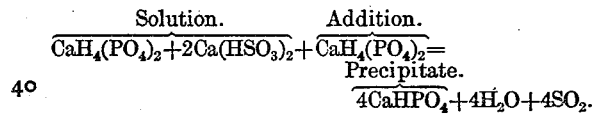

or in the precipitate:

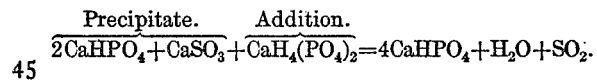

The sulfurous acid must be expelled by boiling, as in the cold, the latter would cause the reformation of monocalcium phosphate and calcium bisulfite.

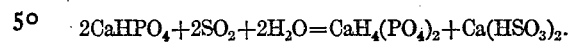

This process is distinguished from the known method of producing calcium phosphate from a solution of tricalcium phosphate in cold aqueous sulfurous acid by the fact that, as stated, a precipitate free from calcium sulfite results. The other known methods whereby dicalcium phosphate is precipitated by milk of lime, from a solution of phosphate of lime in hydrochloric acid (as in the maceration of bones) or from a solution of mineral phosphate in acids, are attended with the disadvantage that the acids used as solvents are entirely lost and that, further, the use of milk of lime becomes necessary. In the present invention however the expense of lime as a means of precipitating, and of acids as solvents is done away with. By these means dicalcium phosphate can be produced from a solution of tricalcium phosphate in cold hydrated sulfurous acid or from the precipitate obtained from such solution by boiling, the distinctive feature whereof is that the monocalcium phosphate is added to the reaction mixture and the sulfurous acid is then eliminated by boiling.

Having now particularly described and ascertained the nature of my invention and in what manner the same is performed, I declare that what I claim is:

1. The process of manufacturing dicalcium phosphate, which consists of treating the product resulting from the solution of tricalcium phosphate in aqueous sulfurous acid with monocalcium phosphate, and applying heat to decompose the sulfite and expel sulfurous acid.

2. The process of manufacturing dicalcium phosphate, which consists of boiling a solution of tricalcium phosphate in aqueous sulfurous acid forming a precipitate containing calcium sulfite, adding monocalcium phosphate to the precipitate and subsequently boiling this mixture for the purpose of obtaining a precipitate free from calcium sulfite.

3. The process of producing dicalcium phosphate from tricalcium phosphate by treating the latter with aqueous sulfurous acid and adding monocalcium phosphate and causing re-action by heating, whereby the sulfite is decomposed and sulfurous acid finally expelled.

In testimony whereof I have signed this specification in the presence of two subscribing witnesses.

EUGEN BERGMANN.

Witnesses:
   WOLDEMAR HAUPT,
   HENRY HASPER.